United States Patent [19]

Russell et al.

[11] Patent Number: 5,010,985
[45] Date of Patent: Apr. 30, 1991

[54] DISC ASSEMBLIES FOR VEHICLE DISC BRAKES

[75] Inventors: David F. Russell, Mickle Trafford; Keith Mungo, Liverpool, both of England

[73] Assignee: Lucas Industries Public Limited Company, Birmingham, England

[21] Appl. No.: 400,509

[22] Filed: Aug. 30, 1989

[30] Foreign Application Priority Data

Sep. 2, 1988 [GB] United Kingdom ............... 8821630

[51] Int. Cl.$^5$ ............................................. F16D 65/10
[52] U.S. Cl. ............................ 188/218 XL; 188/18 A; 188/58
[58] Field of Search ........ 188/218 XL, 205 R, 206 R, 188/71.1, 18 A, 58-59, 73.2, 366, 367, 218 A; 192/107 R, 70.17, 70.16

[56] References Cited

U.S. PATENT DOCUMENTS

| 3,507,370 | 4/1970 | Falch ...................... 188/218 XL X |
| 3,513,949 | 5/1970 | Klassen et al. ........... 188/218 XL X |
| 3,530,960 | 9/1970 | Otto et al. .................. 188/218 XL |
| 3,877,551 | 4/1975 | Gebhardt et al. ............. 188/218 XL |
| 3,939,946 | 2/1976 | Pierre et al. ................. 188/218 XL |

FOREIGN PATENT DOCUMENTS 0215597  3/1987  European Pat. Off. .

Primary Examiner—Douglas C. Butler
Attorney, Agent, or Firm—Bernard L. Kleinke; William Patrick Waters; Jerry R. Potts

[57] ABSTRACT

A disc assembly for a vehicle disc brake has a rotor with a pair of opposite faces from which are mounted annular braking discs. Each disc is mounted for limited radial movement on a carrier device by fasteners located outside the braking area of the disc; and the disc and the carrier device have complementary radial abutment faces, the carrier device being mounted on the rotor by connectors. The brake torque is transmitted from the discs to the carrier device by the abutment faces and then to the rotor by the connectors. This provides a simple construction which reduces stress on the discs and permits and guides radial expansion of the discs during braking.

8 Claims, 3 Drawing Sheets

DISC ASSEMBLIES FOR VEHICLE DISC BRAKES

This invention relates to disc assemblies for vehicle disc brakes of the kind comprising a rotor with a pair of opposite faces, from at least one of which is mounted an annular brake disc having a braking area.

In an assembly of the kind set forth the discs are normally secured to the rotor by bolts passing through clearance openings in the braking areas of the discs. This allows thermal expansion of the discs relative to the rotor, and ensures a frictional engagement so that the braking torque is transmitted from the discs to the rotor. Particular problems arise where such assemblies are used for heavy duty applications, such as high speed trains, because a large amount of heat is generated during braking, causing differential expansion of the discs. This results in large internal stresses around the openings in the discs, which causes surface cracking. Furthermore, if the openings are not located accurately, the discs may not be able to expand freely in a radial direction, and will then run out of balance. As a result, both the braking efficiency and the life of the discs are reduced, which is undesirable.

One attempt at solving these problems is shown in EP-A-0 215 597, where the discs are mounted by roll pins on the rotor, or a support member attached to the rotor, the roll pins being located in complementary recesses in the rotor or support member, and the inner periphery of the discs. Gripping members provided at the outer periphery allow radial movement of the discs while maintaining their frictional engagement with the rotor. The tendency to surface cracking is reduced as there are no openings in the braking area of the discs, and radial expansion is accommodated by flexing of the roll pins. However, the assembly is relatively complex, and costly to manufacture, because of the extra components—the support and gripping members—and the necessity to machine the recesses.

According to the present invention, in a disc assembly of the kind set forth at least one brake disc is mounted for limited radial movement on a carrier means by fastening means located outside the braking area, the disc and the carrier means having complementary radial abutment faces, and the carrier means being mounted on the rotor by connecting means.

As the fastening means are outside the braking area, there need be no openings in this area, so that stresses and surface cracking are reduced. Expansion of the disc is permitted by the fastening means, and it is guided on the radial abutment surfaces to ensure that it remains in balance. Furthermore, a relatively simple construction is provided.

The carrier means has at least two abutment faces, by means of which the brake torque is transmitted from the disc to the carrier means. The torque is then transmitted to the rotor by any suitable means. Conveniently, the torque is transmitted by the connecting means.

The carrier means preferably comprises one or more plates. Conveniently four plates of segmental outline are provided.

The disc may be secured to each plate by at least one fastener. Each fastener preferably comprises a bolt passing through an opening in the plate and a clearance opening in the disc, together with a nut.

Each plate preferably has two opposed abutment faces for transmitting torque. The connecting means preferably comprises at least one connector securing each plate to the rotor. Each connector may comprise a bolt passing through superimposed openings in the rotor and the plate. The connectors may also serve to locate the disc, while allowing it radial movement, in which case the bolt passes through clearance openings in the disc (outside the braking area) as well.

The fastening means and connecting means are preferably located at the outer peripheral edge of the disc. The disc and the carrier plates may be provided with lugs accommodating the openings for the fastening and connecting means.

An embodiment of the present invention is illustrated, by way of example, in the accompanying drawings, in which.

Figure 1:
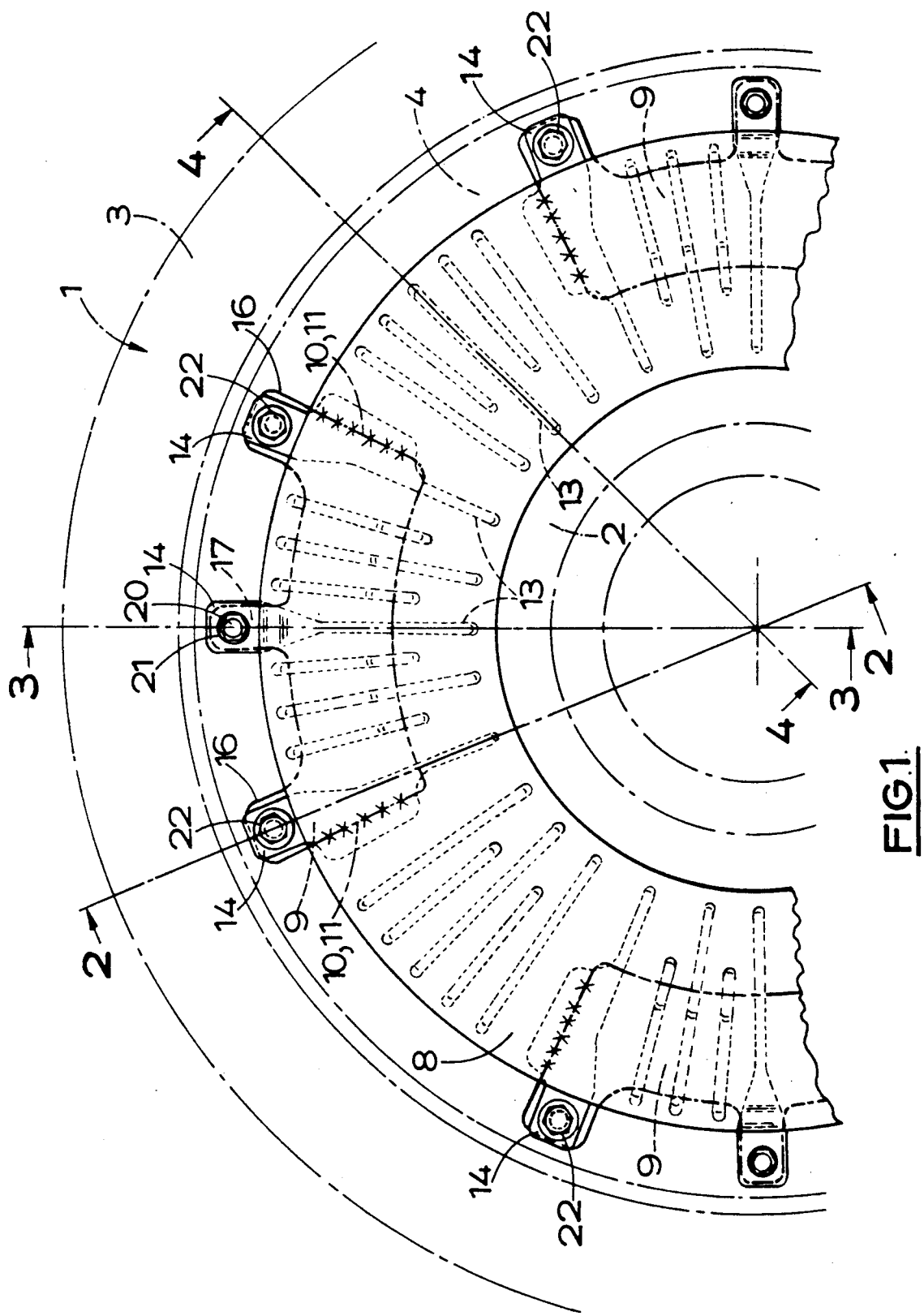
FIG. 1 is a side view of part of a disc assembly for a vehicle disc brake.

The disc assembly shown in the drawings has a rotor 1 in the form of a wheel adapted to be rotatably mounted on an axle (not shown), and comprises a central hub 2 and an outer rim 3 connected by a web 4, from opposite faces 5, 6 of which are mounted annular brake discs 7, 8. The discs 7, 8 are each mounted on the rotor 1 by carrier means in the form of four carrier plates 9 (only three of which are shown), connected to the rotor 1. The discs 7, 8 are fastened to the plates 9 for limited radial movement, and the discs 7, 8 and plates 9 have complementary radial abutment surfaces 10, 11.

Each disc 7, 8 has a planar outer braking face 12, and on its inner face has strengthening ribs 13, several of which are adapted to form the radial abutment surfaces 10. Each disc 7, 8 also has at its outer peripheral edge a plurality of angularly spaced radially projecting lugs 14, which are outside the braking face 12. Each lug 14 has an opening 15, and the two discs 7, 8 are arranged such that the lugs 14 and openings 15 are superimposed.

Each carrier plate 9 (shown in FIG. 1 in chain-dotted outline) is of segmental outline and is substantially planar with its inner face in engagement with the rotor 1, and its outer face engaging the ribs 13. The radial edges of each plate 9 form the abutment surfaces 11, and the engagement of these surfaces 11 with the surfaces 10 acts both to guide the discs 7, 8 as they move radially, and to transmit the braking torque from the discs 7, 8 to the carrier plates 9. Each carrier plate 9 also has three angularly spaced radially projecting lugs at its outer peripheral edge corresponding to three lugs 14 on the discs. The two outer lugs 16 are co-planar with the plate 9, but the central lug 17 is cranked outwardly, to give the plate 9 some resilience. Each lug 16, 17 has an opening 18, and the plates 9 are arranged on the opposite sides of the rotor 1 so that the lugs 16, 17 and openings 18, and the corresponding lugs 14 and openings 15 on the discs 7, 8, are superimposed.

The rotor 1 also has a plurality of angularly spaced openings 19 adjacent the outer periphery of the web 4, these openings 19 corresponding to the openings 18 in the lugs 16 of the plates 9.

Figure 3:
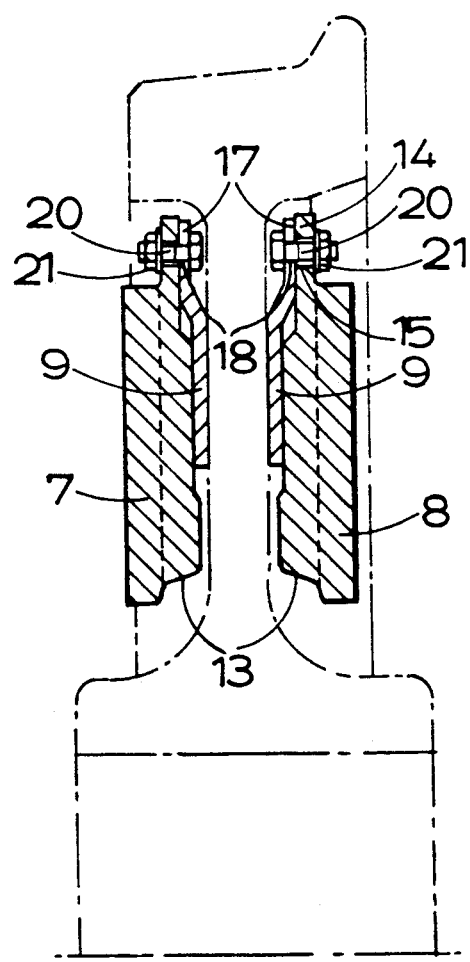
FIG. 3 is a section along the line 3—3 of FIG. 1.
Figure 4:
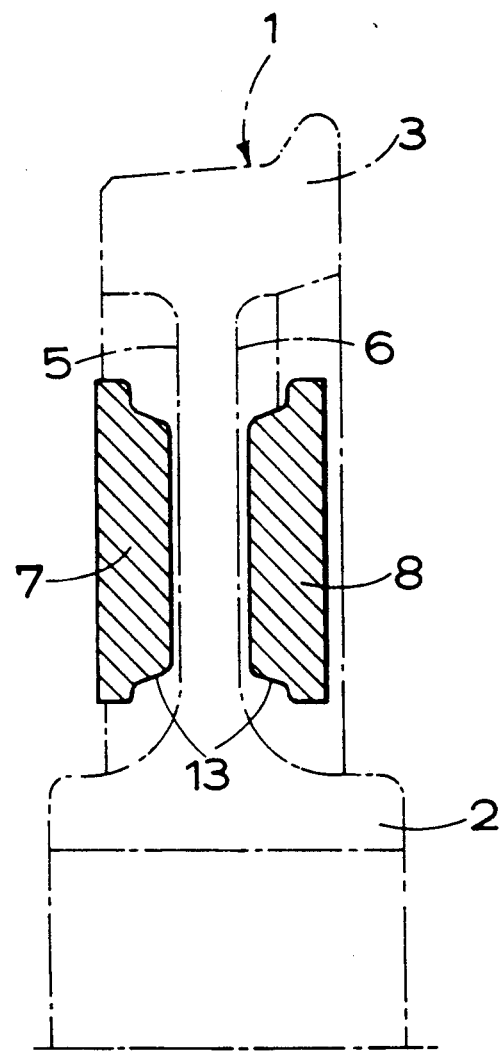
FIG. 4 is a section along the line 4—4 of FIG. 1.

The assembly is fastened together as follows. Each disc 7, 8 is fastened to its carrier plates 9 (as shown in FIG. 3) by a bolt 20 passing through the opening 18 in the central lug 17 of each plate and the opening 15 in the corresponding lug 14, a nut 21 being screwed onto the bolt 20. The openings 15 provide a clearance round the bolts 20, so that the disc 7, 8 can move radially relative to the plates 9.

Figure 2:
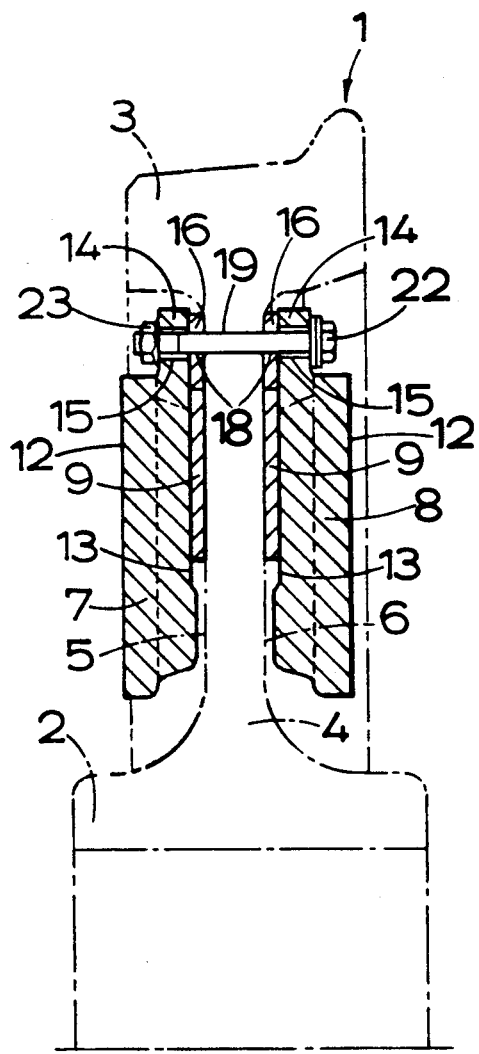
FIG. 2 is a section along the line 2—2 of FIG. 1.

Each plate 9 is fastened to the rotor 1 (as shown in FIG. 2) by bolts 22 which fit closely in the openings 19 in the rotor 1 and the openings 18 in the outer lugs 16, and which pass with clearance through the openings 15 in the discs 7, 8. A nut 23 is screwed onto each bolt 22. This arrangement allows radial movement of the discs 7, 8 relative to the plates 9 and rotor 1, but provides a connection between each plate 9 and the rotor 1 which transmits braking torque during operation of the brake.

Thus, in use, the braking torque is transmitted from the discs 7, 8 to the carrier plates 9 through the abutment surfaces 10, 11, and then to the rotor 1 through the bolts 22.

In use, the radial abutment surfaces 10, 11 guide the thermal expansion of the discs 7, 8 in a radial direction, and it is accommodated by the movement of the discs 7, 8 relative to the plates 9 and the rotor 1 allowed by the clearance openings 15 round the bolts 20, 22. As the expansion is guided, the discs 7, 8 will remain centered, and not run out of balance, and there will be little stress put on the openings 15 and bolts 20, 22. Furthermore, as the bolts and openings are outside the braking surface, they will not be affected greatly by the differential expansion across the discs which occurs in heavy duty applications. The resilience of the plates 9, provided by the cranked lugs 17, also accommodates any axial movement of the discs 7, 8 relative to the rotor 1.

This disc assembly has the advantage not only of increased life in comparison with known designs, but also of increased braking efficiency, particularly as continuous discs 7, 8 are used rather than segmented discs. Of course, if required, the assembly could be modified to accommodate segmented discs.

Furthermore, it will be noted that the construction of the disc assembly is relatively simple, and that it is easy and cheap to manufacture. The particular arrangement of the carrier plates 9 reduces problems with tolerances between the components.

What we claim is:

1. A disc assembly for a vehicle disc brake comprising a rotor, a pair of oppositely directed faces defined on said rotor, and an annular braking disc mounted on each of said faces, each said braking disc having a braking area and circumferentially spaced apart lugs which extend radially outwardly from the perimeter of the braking disc radially beyond the braking area, carrier means including a carrier plate, being secured both to the braking disc and to the rotor, the carrier plate having a plurality of lugs, said lugs extending radially outwardly with respect to the rotor; complementary radial abutment faces being provided on the carrier plate and the brake disc respectively, said lugs on the carrier plate being superimposed on said lugs of the brake disc; means for connecting at least one of said lugs of the carrier plate to the rotor; means for fastening another one of said lugs of the carrier plate to a superimposed one of said lugs of the brake disc; and means for permitting relative radial movement of said disc and said carrier.

2. A disc assembly as claimed in claim 11, said carrier means having a plurality of segmented plates, each one of said carrier plates having at least two abutment faces for transmitting brake torque from the brake disc to the carrier means.

3. A disc assembly as claimed in claim 2, wherein said brake torque is transmitted from said carrier means to said rotor by the said carrier plate lugs.

4. A disc assembly as claimed in claim 11, wherein said means for fastening and said means for connecting include nut and bolt assemblies, said assemblies including bolts passing through openings in the carrier plate lugs and openings in said brake disc lugs.

5. A disc assembly as claimed in claim 11, wherein at least one of said lugs of the carrier plate is secured to the rotor by one of said nut and bolt assemblies, the bolt of the last-mentioned assembly passing through superimposed openings in said rotor and said carrier plate lug.

6. A disc assembly as claimed in claim 1, wherein said carrier means further includes three other carrier plates secured to each of the oppositely directed faces of the rotor, each one of said carrier plates having two abutment faces for engaging against radially extending complementary abutment faces on a brake disc, and three spaced apart radially outwardly projecting lugs, the outermost lugs being secured to the rotor by respective nut and bolt assemblies, and the central lug being secured to a radially extending lug provided on the brake disc by one of said nut and bolt assemblies, wherein the bolts of said nut and bolt assembly secure said central lug to the brake disc.

7. A disc assembly as claimed in claim 6, wherein the central lug is of cranked configuration, the central lug being thus spaced from the rotor.

8. A disc assembly as claimed in claim 1, wherein said means for permitting relative radial movement includes a clearance opening in at least one of said lugs of said disc.

* * * * *

UNITED STATES PATENT AND TRADEMARK OFFICE
CERTIFICATE OF CORRECTION

PATENT NO. : 5,010,985

DATED : April 30, 1991

INVENTOR(S) : David F. Russell

It is certified that error appears in the above-identified patent and that said Letters Patent is hereby corrected as shown below:

Column 4, line 11, after "claim", delete "11", and substitute therefor --1--.

Column 4, line 19, after "claim", delete "11" and substitute therefor --1--.

Column 4, line 24, after "claim", delete "11" and substitute therefor --1--.

Signed and Sealed this

Twenty-second Day of September, 1992

*Attest:*

DOUGLAS B. COMER

*Attesting Officer*     *Acting Commissioner of Patents and Trademarks*